US011809834B2

(12) United States Patent
Chen et al.

(10) Patent No.: US 11,809,834 B2
(45) Date of Patent: *Nov. 7, 2023

(54) MACHINE TRANSLATION USING NEURAL NETWORK MODELS

(71) Applicant: Google LLC, Mountain View, CA (US)

(72) Inventors: Zhifeng Chen, Sunnyvale, CA (US); Macduff Richard Hughes, Los Gatos, CA (US); Yonghui Wu, Fremont, CA (US); Michael Schuster, Saratoga, CA (US); Xu Chen, San Francisco, CA (US); Llion Owen Jones, San Francisco, CA (US); Niki J. Parmar, Sunnyvale, CA (US); George Foster, Ottawa (CA); Orhan Firat, Mountain View, CA (US); Ankur Bapna, Sunnyvale, CA (US); Wolfgang Macherey, Sunnyvale, CA (US); Melvin Jose Johnson Premkumar, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/459,041

(22) Filed: Aug. 27, 2021

(65) Prior Publication Data

US 2022/0083746 A1 Mar. 17, 2022

Related U.S. Application Data

(63) Continuation of application No. 16/521,780, filed on Jul. 25, 2019, now Pat. No. 11,138,392.
(Continued)

(51) Int. Cl.
*G06F 40/58* (2020.01)
*G06N 3/08* (2023.01)

(52) U.S. Cl.
CPC .............. *G06F 40/58* (2020.01); *G06N 3/08* (2013.01)

(58) Field of Classification Search
None
See application file for complete search history.

(56) References Cited

U.S. PATENT DOCUMENTS 10,452,978 B2 10/2019 Shazeer et al.
10,789,427 B2 9/2020 Shazeer et al.
(Continued)

OTHER PUBLICATIONS

Luong et al, Effective Approaches To Attention-based Neural Machine Translation, 2015.*
(Continued)

*Primary Examiner* — Quynh H Nguyen
(74) *Attorney, Agent, or Firm* — Botos Churchill IP Law

(57) ABSTRACT

Methods, systems, and apparatus, including computer programs encoded on computer storage media, for machine translation using neural networks. In some implementations, a text in one language is translated into a second language using a neural network model. The model can include an encoder neural network comprising a plurality of bidirectional recurrent neural network layers. The encoding vectors are processed using a multi-headed attention module configured to generate multiple attention context vectors for each encoding vector. A decoder neural network generates a sequence of decoder output vectors using the attention context vectors. The decoder output vectors can represent distributions over various language elements of the second language, allowing a translation of the text into the second language to be determined based on the sequence of decoder output vectors.

20 Claims, 7 Drawing Sheets

Related U.S. Application Data

(60) Provisional application No. 62/703,518, filed on Jul. 26, 2018.

(56) References Cited

U.S. PATENT DOCUMENTS

| | | | |
|---|---|---|---|
| 10,839,259 B2 | 11/2020 | Shazeer et al. | |
| 2003/0107504 A1* | 6/2003 | Wong-Lam | H03M 5/145 341/58 |
| 2006/0044920 A1* | 3/2006 | Gu | G11C 8/10 365/230.06 |
| 2013/0246322 A1 | 9/2013 | De Sousa Webber | |
| 2018/0052829 A1* | 2/2018 | Lee | G06N 3/0454 |
| 2018/0300609 A1* | 10/2018 | Krishnamurthy | G06N 3/088 |
| 2018/0349359 A1* | 12/2018 | McCann | G06N 3/0445 |
| 2019/0188257 A1* | 6/2019 | Iida | G06F 16/36 |
| 2020/0226748 A1* | 7/2020 | Kaufman | G06K 9/6282 |
| 2020/0342852 A1 | 10/2020 | Kim | |

OTHER PUBLICATIONS

Cheng et al., Long Short-Term Memory Networks for Machine Reading, 2016.*
Ba, et al., "Layer Normalization", arXiv, Jul. 21, 2016, pp. 1-14.
Bahdanau et al, "Neural machine translation by jointly learning to align and translate," arXiv, May 19, 2016, 15 pages.
Bengio et al, "Learning long-term dependencies with gradient descent is difficult," IEEE Xplore, 10 pages, Aug. 27, 2021.
Britz et al, "Massive exploration of neural machine translation architectures," arXiv, Mar. 21, 2017, 9 pages.
Chen et al, "Checkpoint ensembles: Ensemble methods from a single training process," arXiv, Oct. 9, 2017, 7 pages.
Chen et al, "Revisiting distributed synchronous SGD," arXiv, Mar. 21, 2017, 10 pages.
Cho et al, "Learning phrase representations using RNN encoder-decoder for statistical machine translation," arXiv, Sep. 3, 2014, 15 pages.
Chorowski et al, "Towards better decoding and language model integration in sequence to sequence models," arXiv, Dec. 8, 2016, 6 pages.
Crego et al, "Systran's pure neural machine translation system," arXiv, Oct. 18, 2016, 23 pages.
Dauphin et al, "Language modeling with gated convolutional networks," arXiv, Sep. 8, 2017, 9 pages.
Dean et al," Large scale distributed deep networks," NIPS, Dec. 2012, 9 pages.
Denkowski et al, "Stronger baselines for trustable results in neural machine translation," arXiv, Jun. 29, 2017, 10 pages.
Devlin, "Sharp models on dull hardware: fast and accurate neural machine translation decoding on the cpu," arXiv, May 4, 2017, 6 pages.
Elman, "Finding structure in time," Cognitive Science, 1990, 33 pages.
Gehring et al, "Convolutional sequence to sequence learning," arXiv, Jul. 25, 2017, 15 pages.
Goyal et al, "Accurate, large minibatch SGD: training imagenet in 1 hour," arXiv, Apr. 30, 2018, 12 pages.
Grefenstette et al, "Learning to tranduce with unbounded memory," arXiv, Nov. 3, 2015, 14 pages.
He et al, "Deep residual learning for image recognition," arXiv, Dec. 10, 2015, 12 pages.
Hochreiter et al, "Long short-term memory," Neural Computation, 1997, 32 pages.
Hornik et al, "Multilayer feedforward networks are universal approximators," Neural Networks, 1989, 8 pages.
Jean et al, "On using very large target vocabulary for neural machine translation," arXiv, Mar. 18, 2015, 10 pages.
Jouppi et al, "In-datacenter performance analysis of a tensor processing unit," arXiv, Jun. 2017, 17 pages.
Chen et al, "The best of both worlds: combining recent advances in neural machine translation," arXiv, Apr. 27, 2018, 12 pages.
Junczys-Dowmunt et al, "The amu-uedin submission to the wmt16 news translation task: attention-based nmt models as feature functions in phrase-based smt," arXiv, Jun. 23, 2016, 8 pages.
Kalchbrenner et al, "Recurrent continous translation models," ACL Web, 2013, 10 pages.
Kalchbrenner et al, "Neural machine translation in linear time," arXiv, Mar. 15, 2017, 9 pages.
Kingma et al, "ADAM: A method for stochastic optimization," arXiv, Jan. 20, 2017, 15 pages.
LeCun et al., "The handbook of brain theory and neural networks," MIT Press, 2003, 15 pages.
Parikh et al, "A decomposable attention model for natural language inference," arXiv, Sep. 25, 2016, 7 pages.
Pascanu et al, "How to construct deep recurrent neural networks," arXiv, Apr. 24, 2014, 13 pages.
Salimans et al, "Weight normalization: a simple reparameterization to accelerate training for deep neural networks," arXiv, Jun. 4, 2016, 11 pages.
Schuster et al, "Japanese and Korean voice search," IEEE Xplore, Google Inc, Aug. 2012, 4 pages.
Siegelmann et al, "On the computational power of neural nets," Journal of Computer and System Science, Feb. 1995, 10 pages.
Srivastava et al, "Highway networks," arXiv, Nov. 3, 2015, 6 pages.
Sutskever et al, "Sequence to sequence learning with neural networks," NIPS, 2014, 9 pages.
Szegedy et al, "Rethinking the inception architecture for computer vision," arXiv, Dec. 11, 2015, 10 pages.
Vaswani et al, "Attention is all you need," arXiv, Dec. 6, 2017, 15 pages.
Wu et al, "Google's neural machine translation system: bridging the gap between human and machine translation," arXiv, Oct. 8, 2016, 23 pages.
Zhou et al, "Deep recurrent models with fast-forward connections for neural machine translation," arXiv, Jul. 23, 2016, 13 pages.

* cited by examiner

MACHINE TRANSLATION USING NEURAL NETWORK MODELS

CROSS-REFERENCE TO RELATED APPLICATIONS

This patent application is a continuation (and claims the benefit of priority under 35 USC 120) of U.S. patent application Ser. No. 16/521,780, filed Jul. 25, 2019, which claims the benefit of U.S. Provisional Application No. 62/703,518 filed Jul. 26, 2018, and titled "Machine Translation Using Neural Network Models," which is incorporated herein by reference.

BACKGROUND

This specification relates generally to machine translation using neural network models.

SUMMARY

Techniques related to machine translation are described below for translating text from one language to another language. The techniques use neural networks to translate one or more words in a first language to a sequence of one or more words in a second language. For example, the neural networks can translate "What is your name?" in English to the same phrase in Spanish—"¿Cómo to llamas?" The neural networks rely on an enhanced recurrent neural network machine translation model (RNMT+) that is based on a recurrent neural network (RNN) model. The RNMT+ can include a deep learning artificial neural network with an encoder, a multi-headed attention mechanism, and a decoder. The multi-headed attention mechanism is situated in between the output of the encoder and the input of the decoder. The encoder, multi-headed attention mechanism, and decoder are situated in a sequential fashion in order to successfully produce a likelihood of a word in a second language based on an input word in a first language.

The RNMT+ offers significant improvements over typical RNNs. For example, the RNMT+ improves translation accuracy over typical RNNs producing similar translations. The RNMT+ can rely on various optimization techniques and processes that provide for a faster and more efficient translation process during implementation. For example, the RNMT+ incorporates training processes that execute in parallel and optimize the RNMT+ to outperform typical RNNs. As a result, a properly trained RNMT+ can lead to significant improvement in translation speed and translation accuracy.

In some implementations, neural network machine learning models can be used to translate text from one language to another. The sequence-to-sequence models discussed below can provide greater accuracy than prior approaches such as traditional RNN-based approaches and the Transformer model. Various techniques that provide enhanced accuracy include multi-headed attention, label smoothing, synchronous training, and layer normalization. In addition, hybrid architectures can also provide further improvements to translation accuracy, by combining strengths of the techniques noted above with strengths of the Transformer model. For example, a decoder neural network can include multiple decoder components having different neural network structures, in a serial or cascaded arrangement or in a parallel or multi-column arrangement.

In general, one innovative aspect of the subject matter described in this specification can be embodied in methods that include the actions of obtaining, by the one or more computers, a series of feature vectors representing characteristics of the text in a first language; generating, by the one or more computers, encoding vectors from the feature vectors by processing the feature vectors with an encoder neural network comprising a plurality of bidirectional recurrent neural network layers, each encoding vector having a predetermined number of values; processing, by the one or more computers, the encoding vectors using a multi-headed attention module configured to generate multiple attention context vectors for each encoding vector, wherein the multi-headed attention module includes multiple sets of parameters, and the multiple sets of parameters are respectively used to generate attention context vectors from different subsets of each encoding vector; generating, by the one or more computers, a sequence of output vectors using a decoder neural network that receives the attention context vectors, the decoder neural network comprising a plurality of unidirectional recurrent neural network layers, the output vectors distributions over various language elements of the second language; and determining, by the one or more computers, a translation of the text into the second language based on the sequence of output vectors.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes storing data indicating the translation in a data retrieval system. The method includes accessing the stored data indicating the translation. The method includes providing the translation to one or more client devices over a communication network.

In some implementations, the method includes for each of the plurality of bidirectional recurrent neural network layers in the encoder neural network, the outputs of the forward layer and the backward layer are concatenated before being fed into the next layer.

In some implementations, the method includes the plurality of bidirectional recurrent neural network layers of the encoder neural network include long short-term memory (LSTM) layers.

In some implementations, the method includes the parameters of the multi-headed attention module are weighting values, and the multi-headed attention module applies the different sets of the parameters to different non-overlapping continuous chunks of the encoding vectors.

In some implementations, the method includes the multi-headed attention module includes multiple chunk processors, each chunk processor including a separately trained neural network, each of the chunk processors generating a different one of the attention context vectors for each encoding vector.

In some implementations, the method includes the multi-headed attention module generates the attention context vectors for a processing step based on (i) the encoding vector output by the encoder neural network for the processing step and (ii) a state of the first layer of the decoder neural network.

In some implementations, the method includes the decoder neural network is configured to receive the attention context vectors, concatenated together, at each of the unidirectional recurrent neural network layers and at a softmax layer providing output of the decoder neural network.

In some implementations, the method includes the encoder neural network and the decoder neural network include LSTM elements or gated recurrent unit (GRU) elements.

In some implementations, the method includes language elements of the second language include characters, word pieces, words, or phrases.

In some implementations, the method includes the encoder neural network and the decoder neural network applies per-gate layer normalization for each LSTM cell of the LSTM layers.

In some implementations, the method includes the encoder neural network and the decoder neural network include a normalization layer between each recurrent hidden neural network layer, the normalization layers configured to shift activations to a range that avoids saturation of a squashing function for propagation to a subsequent neural network layer.

In some implementations, the method includes the encoder neural network, multi-headed attention module, and/or the decoder neural network have been trained using synchronous training.

In some implementations, the method includes the encoder neural network, multi-headed attention module, and/or the decoder neural network have been trained using a learning rate that increases gradually over the course of training.

In some implementations, the method includes the encoder neural network, multi-headed attention module, and/or the decoder neural network have been trained using label smoothing that introduces variability into target labels.

In some implementations, the method includes label smoothing manipulates an input vector for a neural network by altering or replacing one or more elements of the input vector.

In some implementations, the method includes the encoder neural network includes a first encoder module and a second encoder module, wherein the first encoder module and the second encoder module have different neural network topologies. The first encoder module uses a transformer layer structure and has layers that each include (i) a self-attention network sub-layer and (ii) a feed-forward network sub-layer. Additionally, the second encoder module includes a series of bidirectional recurrent neural network layers each providing normalization before processing by the next recurrent layer.

In some implementations, the first encoder neural network (i) avoids any sequential dependences in the encoder network, performs computation for each of the sub-layers having a computation sequence of normalization, transformation, dropout, and residual-addition, and (iii) the self-attention sub-layers are arranged so that each position in the current layer has access to information from all other positions in the previous layer.

In some implementations, the encoder neural network includes a cascaded encoder including one of the encoder modules providing output to a normalization layer that provides output to the other of the encoder modules. The output of the cascaded encoder is provided to the decoder neural network as the encoding vector.

In some implementations, the method includes the encoder neural network includes a multi-column encoder in which the first encoder module and the second encoder module each generate an encoder output based on a feature vector, and the multi-column encoder merges the encoder outputs of the first encoder module and the second encoder module to produce encoding vectors.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Neural networks can be trained as machine translation models to convert a sequence of one or more words in a first language to a sequence of one or more words in a second language. For example, a machine translation model can convert the phrase in English "hello, how are you?" to the same phrase in French "Salut, comment allez-vous?" A machine translation model with an encoder and decoder paradigm can be used to provide excellent accuracy of translation. For example, the encoder and decoder paradigm can be implemented in an RNN model with a multi-headed attention mechanism acting in between the encoder and decoder.

As discussed further below, an improved RNN model can be used to predict a likelihood of a sequence of words using a deep learning artificial neural network. The RNN provides processed vectors between the encoder and decoder and is capable of capturing information from an infinite length of input sentences. The RNN-based NMT approach, or more formally knowns as RNMT, can incorporate parallel training to take advantage of efficient computing devices, such as GPUs and Tensor Processing Units (TPUs), for example. By combining the RNMT with various modeling improvements and optimization techniques, as described below, a RNMT+ model can significantly outperform other NMT models in terms of accuracy of translations between various languages.

Figure 1:
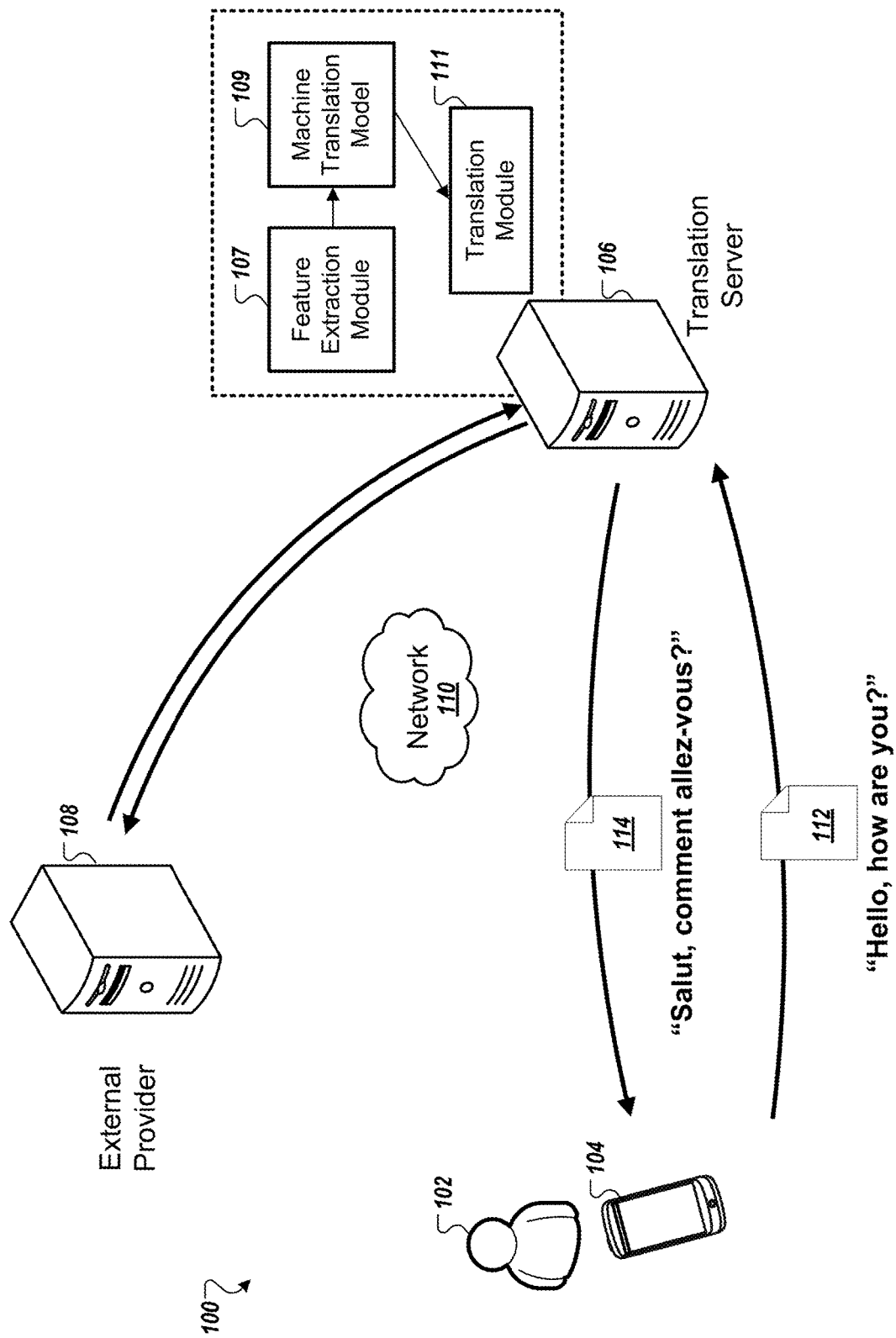
FIG. 1 illustrates an example of system for performing machine translation using a neural network model.

FIG. 1 illustrates an example of a system 100 for machine translation using a neural network model. The system 100 includes a client device 104, a translation server 106, an external provider 108, and a network 110. The translation server 106 can include one or more computers connected locally or over a network. The translation server 106 includes a feature extraction module 107, a machine translation model 109, and a translation module 111. The feature extraction module 107 and the machine translation model 109 in the translation server 106 may be implemented in software, hardware, firmware, or a combination thereof.

The example of FIG. 1 shows the translation server 106 processing an input phrase 112 from a client device 104 of user 102. In the example, the translation server 106 shown in FIG. 1 receives the input phrase 112 from client device 104 and outputs a translated phrase 114 back to the client device 104. The phrase can be spoken (e.g., in the form of audio data) or may be provided as textual data. The translation server 106 processes the input phrase in a first language and outputs a translated phrase in a second language, as further described below.

In other implementations, the translation server 106 can receive an input phrase from the external provider 108 and output the translated phrase to provide back to the translation server 106. The client device 104 can transmit the input phrase 112 and receive the output-translated phrase 114 over the network 110. Alternatively, the translation server 106 can be implemented in the client device 104. Similarly, the external provider 108 can transmit an input phrase over the network 110 to the translation server 106. Additionally, the translation server 106 can be implemented in the external provider 108.

In some implementations, the user 102 can input the phrase 112 to the client device 104. For example, the user 102 can speak a phrase, such as "Hello, how are you?" to an application of the client device 104, and the client device 104 converts the spoken phrase into data to transmit. In another example, the user 102 can type the phrase, e.g., "Hello, how are you?," into the application of the client device 104 using a touch-screen or keyboard of the client device 104. The user 102 can enter the phrase in English or in a language other than English. The application of the client device 104 can indicate to the user 102 whether the other language can be properly translated by the translation server 106.

In some implementations, the external provider 108 provides a text to the translation server 106 for translation processing. The external provider 108 may provide text from a web page and request that the text be translated into a specified language. As another example, the external provider 108 can be a television that provides second audio programming (SAP) to users that request SAP. The television can provide spoken audio or subtitled text to the translation server 106. The translation server can convert the spoken audio to text or process the subtitled text (whichever the television sent) in a first language, convert the phrase in the first language to a phrase in a second language, and provide the converted phrase in the second language back to the television. In some cases, the external provider 108 can provide the phrase in a first language to the translation server 106 in real time. In other cases, the external provider 108 can provide the phrase in a first language to the translation server 106 during an offline mode.

The translation server 106 can include a feature extraction module 107, a machine translation model 109, and a translation module 111. The feature extraction module 107 generates feature data from the input phrase data. The generated feature data can include a set of feature vectors, with each feature vector indicating textual or acoustic characteristics during a different portion or window of the input phrase data 112. Each feature vector can indicate properties of the phrase data, such as segmentations of the phrase data 112. For example, each feature vector can include a letter of the phrase data, a word of the phrase data, or the entire phrase data itself. Additionally, each feature vector can include a portion of phrase data that describes previous frames and/or subsequent frames. For example, as illustrated in FIG. 1, the feature extraction module 107 can extract feature vectors from the input phrase data 112 "Hello, how are you?" to a first feature vector of "/Hel/," a second feature vector of "/lo,h/," a third feature vector of "/owa/," a fourth feature vector of "/rey/", and a fifth feature vector of "/ou?/." In other implementations, each feature vector can indicate tokenized words from the phrase data 112. For example, the tokenized words can include ["Hello", "how", "are", "you"]. The translation server 106 provides the extracted feature vectors as input to the machine translation model 109.

The machine translation model 109 has been trained to output probabilities that indicate a likelihood of occurrence of translated words from the input phrase data 112, e.g., a distribution over a predetermined set of words in the second language for a text to be translated into. The machine translation outputs can be a vector of probability scores that the respective likelihoods that different words should be used in the translated sequence. In some implementations, an output vector or set of probabilities can be output from the machine translation model 109 for each feature vector provided as input.

In some implementations, the translation server 106 can include an input setting that indicates the desired input language for the phrase data 112 and an output setting that indicates the desired output language for the output phrase data 114. A user can change the input setting to a different language and can change the output setting to a different language. For example, user 102 may open an application or web page on his/her client device 104 that allows for changing the language input setting and/or the language output setting at the translation server 106. The user 102 can indicate to the translation server 106 to change the input language from "English" to "French" and change the output language from "French" to "English." Based on the user's input setting and output setting, the translation server 106 will select the proper machine translation model 109. For example, if the input setting is set to "French" and the output setting is set to "English," the translation server 106 will select the machine translation model 109 that properly translates French to English. Additionally, the translation server 106 will select another machine translation model 109 if the input setting is set to "English" and the output setting is set to "French." Thus, a different machine translation model 109 is required from a language pair and a direction of the language. In other implementations, one machine translation model 109 can be used for each of the language pairs and a direction of the language pairs.

In some implementations, the input phrase data 112 includes an indication of the language of the phrase data 112 and an indication of the desired language output. For example, the user 102 may indicate to the client device 104 to translate the phrase "Hello, how are you?" from English to German. The client device 104 may package the phrase "Hello, how are you?," data that indicates the input phrase is English, and data that indicates the desired output phrase to be German into the. Upon the translation server 106 receiving the phrase data 112, the translation server 106 can parse the phrase data 112 to determine the language of the input phrase. In some implementations, the translation server 106 can automatically determine a language of the phrase itself. However, the phrase data 112 can still indicate the desired output language so the translation server 106 can determine which machine translation model 109 to use and further, determine the desired output language.

The machine translation model 109 outputs are provided to a translation module 111. The translation module 111 uses the sets of probability outputs to identify a transcription in the desired language. The translation module 111 can access a database of words at the translation server 106 for identifying the transcription in the desired language from the set of output probabilities. The translation module 111 retrieves words from the database that indicate the highest likelihood of probability to be the correct output in the desired output language. For example, the translation module 111 can determine that the correct output in the desired output language recites "Salut, comment allez-vous?" The translation module 111 may use a beam-search algorithm or other techniques to determine a transcription from the output probability scores from the machine translation model 109.

The translation server 106 provides the output phrase data 114 in the desired output language to the client device 104 over network 110. The output phrase data 114 can be provided to the client device 104 over the network 110 in response to receiving the input phrase data 112 from the client device 104.

Figure 2:
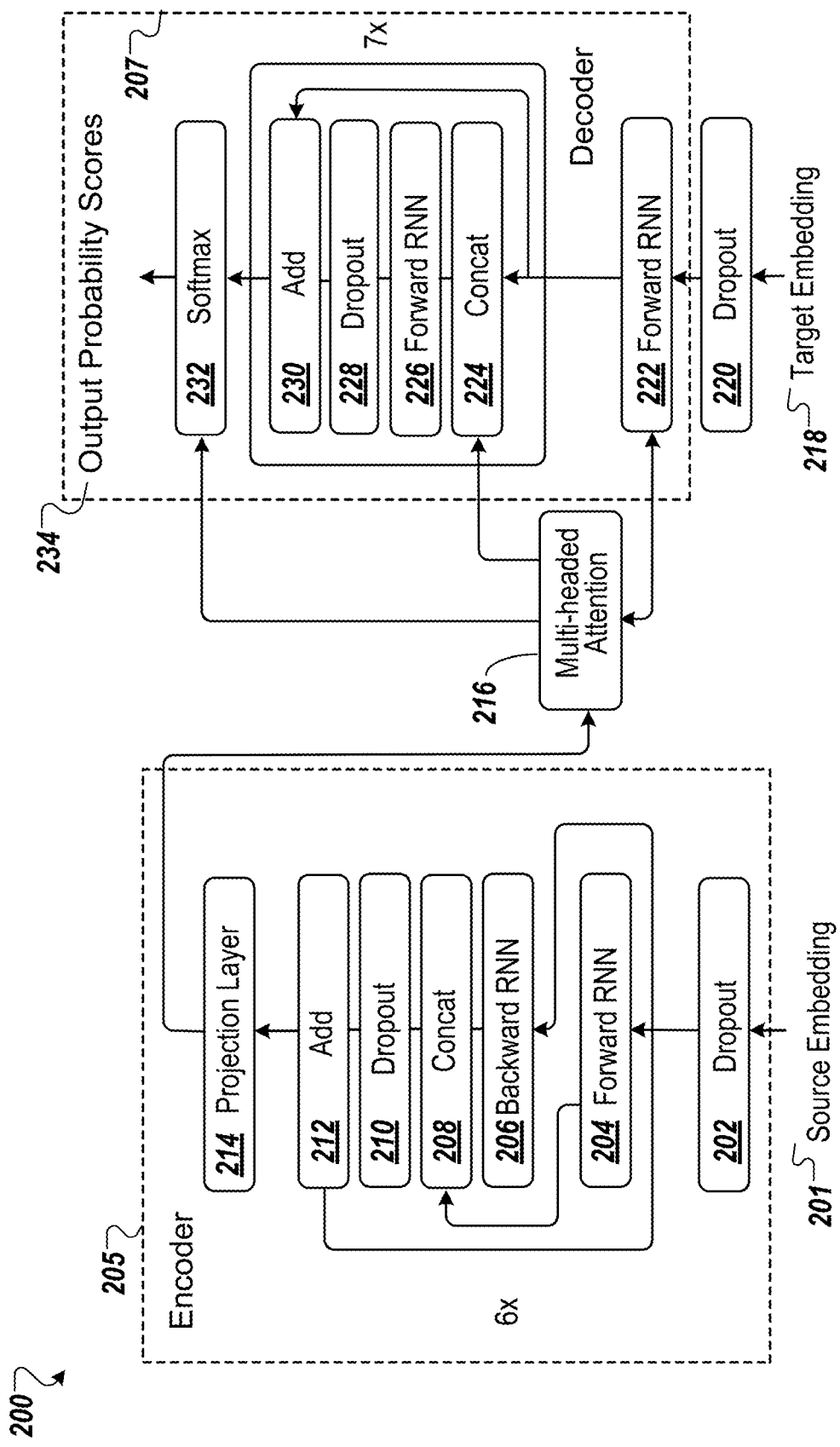
FIG. 2 illustrates an example of an enhanced recurrent neural network machine translation (RNMT+) model.

FIG. 2 illustrates an example of an enhanced recurrent machine neural translation model (RNMT+) 200. The machine translation model 109 can include the RNMT+ 200 as illustrated. The RNMT+ 200 may include a deep LSTM (Long Short Term Memory) recurrent neural network architecture built by stacking multiple LSTM layers. The RNMT+ 200 includes an encoder 205, a multi-headed attention module 216, and a decoder 207. The encoder 205 includes 6 bidirectional LSTM layers. The 6 bidirectional LSTM layers in the encoder 205 includes a dropout layer 202, a forward RNN layer 204, a backward RNN layer 206, a concatenation layer 208, a dropout layer 210, and an add layer 212. The encoder 205's bidirectional LSTM layers include a plurality of forward-propagating LSTM layers and a plurality of backward-propagating LSTM layers, with two LSTM layers at each depth—one operating in the forward and another operating in the backward direction in time over the input sequence. Both of these layers at the same depth are connected to both previous forward and backward layers. Finally, a projection layer 214 is added to the final output of the encoder 205.

As shown in FIG. 2, the translation server 106 provides a source embedding 201 into the encoder 205. The feature extraction module generates a source embedding 201 (i.e., a feature vector) extracted from the input phrase 112. The source embedding 201 can be 1024 dimensions long. Each layer in the encoder 205 and the decoder 207 can 1024 dimensions. The dropout layer 202 included in the encoder 205 dropped one or more nodes in a neural network layer. For example, during training of the RNMT+ 200, a random set of nodes in the dropout layer 202 are not considered for processing during a forward or backward pass of data. A benefit of including a dropout layer 202 in the encoder 505 is that each node in that neural network layer will not become co-dependent upon one another. When nodes in a neural network layer become dependent upon one another, the individual value of each node leads to over-fitting of training data. In addition, by dropping the number of nodes in the dropout layer 202, the amount of training time required for RNMT+ 200 to converge nearly doubles, which ensures that each node in the neural network layer is forced to sufficiently learn the robust features of the training data, and thus, increases the overall accuracy of the neural network output when used in practice. The output of the dropout layer 202 includes a vector set of data that includes 1024 dimensions. The output of the dropout layer 202 is provided as input to the forward RNN layer 204.

The forward RNN layer 204 is a type of recurrent neural network in which data is processed in the forward direction from left to right. The output of the forward RNN layer 204 includes a vector set of data that includes 1024 dimensions. The output of the forward RNN layer 204 is provided as input to the concatenation layer 208.

The concatenation layer 208 receives input from the output of the backward RNN layer 206 and from the output of the forward RNN layer 204. The concatenation layer 208 takes in multiple inputs that have similar height and width dimensions and concatenates the two inputs. For example, the output of the backward RNN layer 206 is a 1-row vector of 1024 dimensions. Additionally, the output of the forward RNN layer 204 is 1-row vector of 1024 dimensions. Thus, the output of the concatenation layer 208 is a 1-row vector of 2048 dimensions from the concatenated input from the forward RNN layer 204 and input from the backward RNN layer 206.

The backward RNN layer 206 is a type of recurrent neural network in which data is processed in the backward direction, e.g., from right to left or from the end of the sequence toward the beginning. The backward RNN layer 206 at the input layer receives a feature vector from the sequence, but in the opposite order as the forward layer. For example, if there are n feature vectors in the input sequence, at the first time step the forward layer receives input vector 1 while the backward layer receives vector n. At the second time step, the forward layer receives input vector 2 while the backward layer receives vector n−1, and so on. The output of the backward RNN layer 206 includes a vector set of data that includes 1024 dimensions. The output of the backward RNN layer 206 is provided as input to the dropout layer 210.

The dropout layer 210 is similar in functionality to the dropout layer 202. Dropout layer 210 receives a vector of 2048 dimensions from the concatenation layer 208.

The add layer 212 sums together the output from the dropout layer 210 and the output from the backward RNN layer 206. For example, the add layer 212 can combine the vector from the dropout layer 210 and the vector from the backward RNN layer 206.

The projection layer 214 converts the output of the add layer 212 to a dimensionality that matches the dimensional input requirements of the decoder 207. For example, if the output of the add layer 212 is a 2×3 matrix, and the input to the decoder 207 requires a 1 dimensional vector, then the projection layer 214 converts the 2×3 matrix to a 6×1 vector. After conversion, the projection layer 214 provides the 6×1 vector to the multi-headed attention module 216.

The RNMT+ 200 also includes a multi-headed attention module 216. The multi-headed attention module 216, which will be further described with respect to FIG. 3, divides the vector from the output of the projection layer 214 by the number of neural networks in the multi-headed attention module 216. For example, the multi-headed attention module 216 can include four neural networks for processing. If the input vector has a 1 row vector with 1024 dimensions, then the multi-headed attention module 216 divides the 1024 dimension by four (e.g., for the number of neural networks). The multi-headed attention module 216 provides one fourth of the 1024 dimension vector, or one of the divided vectors, to each of its neural networks for processing. By performing multi-headed attention instead of single headed attention, the vectors can be processed by each neural network in parallel and as a result, the various dimensions from each of the divided vectors can be processed independently. Thus, the accuracy of the multi-headed attention 216's processing is increased.

The RNMT+ 200 includes a decoder 207 with 8 unidirectional (forward) LSTM layers. Each unidirectional LSTM layer of the decoder 207 includes forward RNN layer 222 and 7 forward RNN layers 226. After the dropout layer 202, there is a structure comprising a concatenation layer 224, a forward RNN layer 226, a dropout layer 228, and an addition layer 230. This structure is repeated seven times as illustrated by the "7×" in FIG. 2. The output of the repeated layer structure is provided to a softmax layer 232, which generates the output of the decoder, e.g., mapping output activations of the network to a distribution of probability scores of the set of possible output words in the target language. In general, dropout layer 220 is similar in functionality to dropout layer 202. Forward RNN layer 222 is similar in functionality to forward RNN layer 204. Concatenation layer 224 is similar in functionality to concatenation layer 208. Forward RNN layer 226 is similar in functionality to forward RNN layer 204. However, forward RNN layer 226 receives a vector array that is two times the dimensionality size of the input provided to the forward RNN layer 204. For example, forward RNN layer 226 receives a vector array with a size of 1×2048, and forward RNN layer 204 receives a vector array with a size of 1×1024. The dropout layer 228 is similar in functionality to the dropout layer 210. The addition layer 230 is similar in functionality to the add layer 212.

In some implementations, the translation server 106 uses target embeddings 218, in sequences of training data representing accurate translations of full language sequences, to train the RNMT+ 200. The translation server 106 can retrieve sub-word units for each source-target language pair for a full language sequence, such as a sentence or phrase, from a database. The database can include sub-word units for various source target language pairs that includes, French to English, English to French, English to German, and German to English, to name a few examples. For example, the sub-word units for various source-target language pairs can include "Hello" to "Bonjour", "Bonjour" to "Hello", and "Hello" to "Guten Tag." In another example, the full language sequence can include "Hello. How are you?" to "Bonjour. Comment allez-vous?" and each word in the full language sequence can be a sub-word unit. The size of the database can be 32K sub-word units or greater.

During training, the translation server 106 retrieves the source target language pairs from the database for training a particular model. For example, for training the RNMT+ 200 for an English to French translation, the translation server 106 retrieves English to French translation pairs to train the RNMT+ 200. The English to French translation pairs can include "Hello" to "Bonjour," "Goodbye" to "Au revoir," and "smile" to "sourire," to name a few examples. Then, to train, the translation server 106 first provides each source target language pair to the feature extraction module 107 to generate a feature vector embedding for each source and each target pair, respectively. The translation server 106 provides the feature vector embedding for the word "Hello" as the source embedding 201 into the encoder 205. Simultaneously, the translation server 106 provides the feature vector embedding for the word "Bonjour" as the target embedding 218 into the decoder 207. The translation server 106 provides each of the source target language pairs of English to French from the database for training the English to French RNMT+ 200 model. Once the English to French RNMT+ 200 model converges and outputs probability scores 234 that are high, the training is complete. The same process occurs for other language pairs. For example, the translation server 106 provides each of the source target language pairs of French to English from the database for training the French to English RNMT+ 200 model. The same functionality occurs for the English to German and German to English models. In other implementations, the translation server 105 retrieves a full language sequence from the database for training a particular model. The full language sequence can be in English, French, or German. The full language sequence can include a set of source sub-word units and target sub-word units. The translation server 106 can provide the feature vector of each source sub-word unit from the full language sequence and each target sub-word unit from the full language unit into the encoder 205 and the decoder 207, respectively.

The softmax layer 232 is the final layer in the RNMT+ 200. Typically, the softmax layer 232 outputs a probability distribution of a number of possible outcomes from the inputs. The higher the probability output from the softmax layer 232, the higher the likelihood of an indication that the translated output is correct. For example, the translation server 106 may provide the input ["Hello"; "how"; "are"; "you"] as feature vectors to the source embedding 201 input of the RNMT+ 200. The RNMT+ 200 can translate the input phrase and output the translated phrase in French with corresponding probability scores, such as, ["Salut", 0.9; "comment", 0.8; "allez", 0.7; "-vous", 0.9]. In some implementations, the RNMT+ 200 model can process the phrase input 112 in English to other languages, such as German, Spanish, and Russian, to name a few examples, based on how the model is trained. Alternatively, the RNMT+ 200 can process the text input 112 in another language, other than English, such as, Italian, German, and French, to name a few examples.

Figure 3:
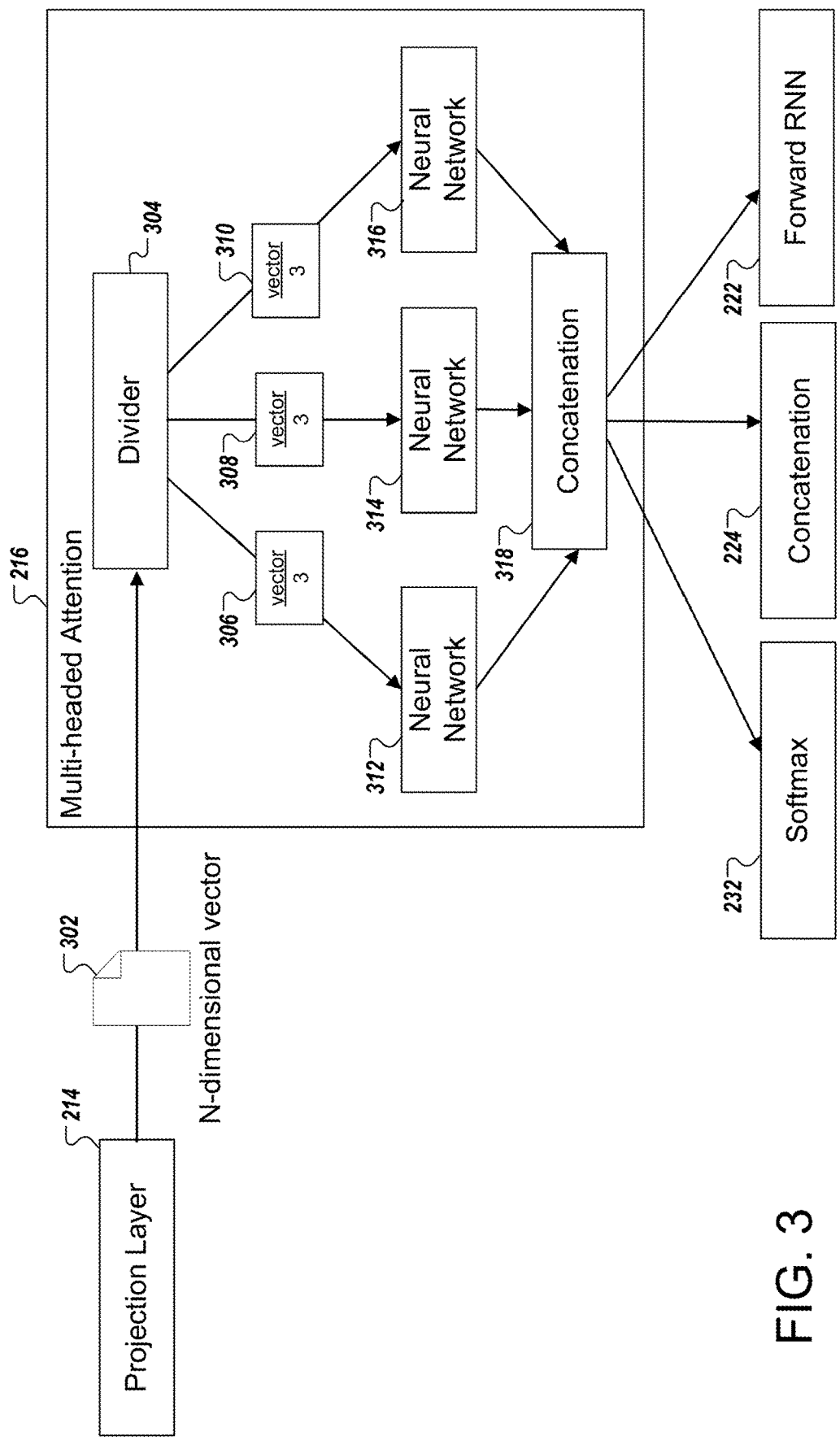
FIG. 3 illustrates an example of a multi-headed attention network.

FIG. 3 illustrates an example of a multi-headed attention network. The multi-headed attention module 216 can include a divider module 304, N number of neural networks, and a concatenation module 318. FIG. 3 illustrates three neural networks (e.g., neural network 312, neural network 314, and neural network 3) each trained with various weights and various parameters to process a portion of the N-dimensional vector 302. Any number of neural networks can be shown in the multi-headed attention module 216, three are shown for illustrative purposes only. In some implementations, the multi-headed attention module 216 helps the RNMT+ 200 align and translate the incoming feature vectors. The multi-headed attention module 216 aligns to identify which part of the input sequence is relevant to each word in the output sequence. Additionally, the multi-headed attention module 216 translates by using relevant information of the input and weights of the neural network to select the appropriate output.

The projection layer 214 outputs an N-dimensional vector 302 (e.g., encoder output vector) from the encoder 205. The projection layer 214 may provide the N-dimensional vector 302 to have a dimension that equals the input dimension of the decoder 207. In some implementations, the operation of the attention network may adjust the dimensionality by producing a vector that has more or fewer values than the output of the projection layer 214.

In some implementations, the projection layer 214 may output the vector 302 to be a 1-row vector of 1024 dimensions. The translation server 106 provides the 1-row vector of 1024 dimensions to a divider module 304 of the multi-headed attention module 216. The divider module 304 divides the N-dimensional vector 302 into a predetermined number of segments, with each of neural networks 312, 314, 316 receiving one segment. The segments are generally non-overlapping, contiguous groups of the encoded vector from the encoder module. For example, if the size of the N-dimensional vector 302 is 1×4096 and the number of neural networks is four, then the divider module 304 divides the N-dimensional vector 302 into four N-dimensional vectors of size 1×1024. As illustrated in FIG. 3, there are three attention "heads," e.g., three neural networks in the attention module, so the divider module 304 produces three output vectors, vector 306, vector 308, and vector 310, each including a different portion of the encoder output vector 302. Vectors 306, 308, and 310 are each have a number of values equal to the number of values in the N-dimensional vector 302 divided by three (e.g., the number of neural networks), so each vector 306, 308, and 310 is a different third of the vector 302.

The neural networks 312, 314, and 316 can be an RNN, a Convolutional Neural Network (CNN), or any other type of neural network.

In some implementations, the output of each neural network (e.g., neural network 312, neural network 314, and neural network 316) can be a set of probabilities. In other implementations, the output of each neural network can be a set of vector outputs. The size of the vector outputs can be the same size as each of respective vector 306, vector 308, and vector 310.

In some implementations, the concatenation module 318 combines the output from each of the neural networks into a data output vector. As shown in FIG. 3, the concatenation module 318 concatenates the output of the neural network 312 with the output of the neural network 314. The output of neural network 316 is concatenated with the output of neural networks 312 and 314. For example, the neural network 312 can output a vector of size 1×1048, the neural network 314 can output a vector of size 1×1048, and the neural network 316 can output a vector of size 1×1048. The concatenation module 318 can concatenate in the following way: [first vector|second vector|third vector]. The output of the concatenation module 318 is provided to the softmax layer 232, the concatenation layer 224, and the forward RNN layer 222 at the decoder 207.

Figure 4:
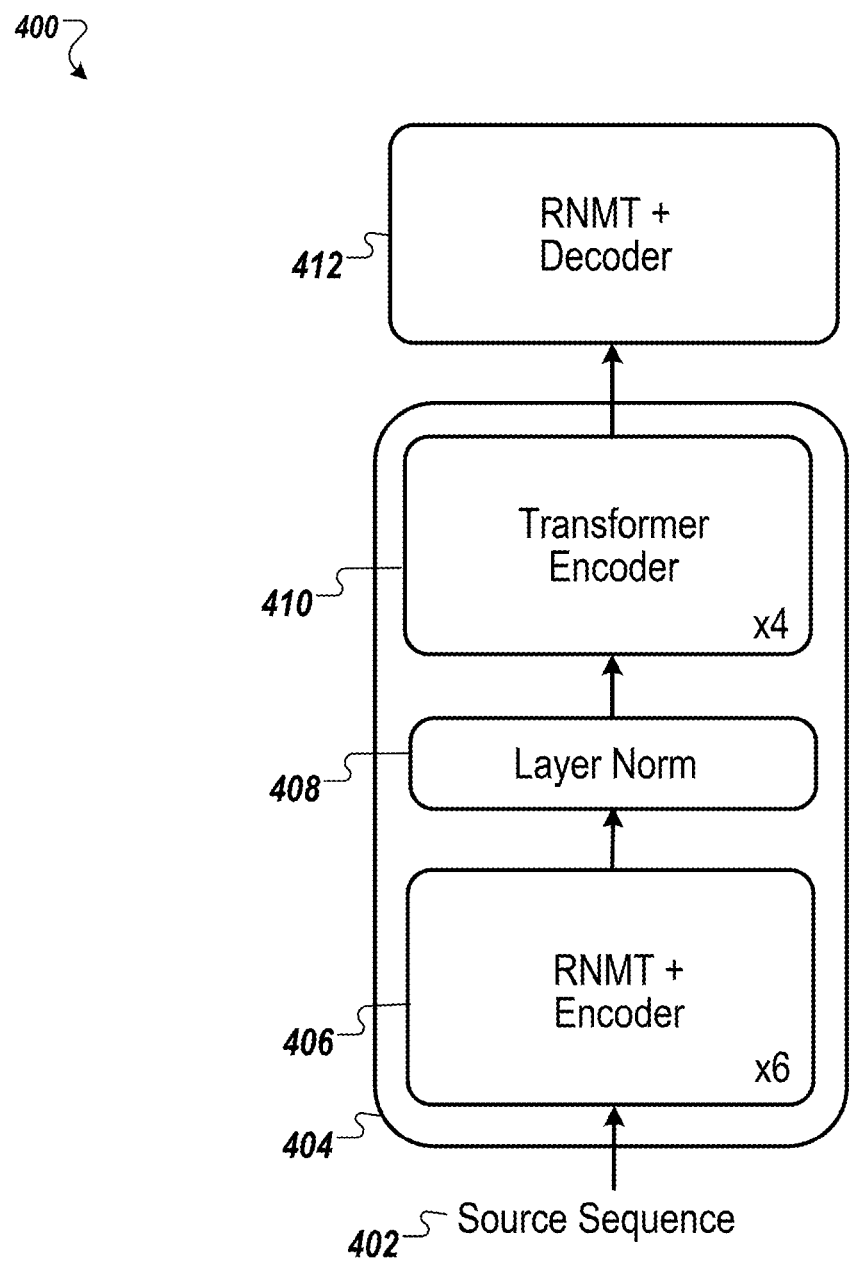
FIG. 4 illustrates an example of a neural network model having an encoder that includes a transformer encoder module and an RNMT+ encoder module in a cascaded arrangement.

FIG. 4 illustrates an example of a system 400 of a transformer model and RNMT+ model components in an encoder. The system 400 illustrates a cascaded encoder 404 and an RNMT+ Decoder 412. The RNMT+ Decoder 412 may be similar to the decoder 207. The cascaded encoder 404 includes an RNMT+ Encoder 406, a layer normalization 408, and a transformer encoder 410. The cascaded encoder 404 and the RNMT+ Decoder 412 can include a multi-headed attention module between the transformer encoder 410 and the RNMT+ Decoder 412, similar to the multi-headed attention module 216. The focus of the system 400 is to enrich the set of stateful representations by cascading a feature extractor with the cascaded encoder 404 and fine tuning the layers of the transformer encoder 410 stacked on top of a pre-trained frozen RNMT+ encoder. The source embeddings 402 can be provided to the cascaded encoder 404 to start the translation process.

Figure 5:
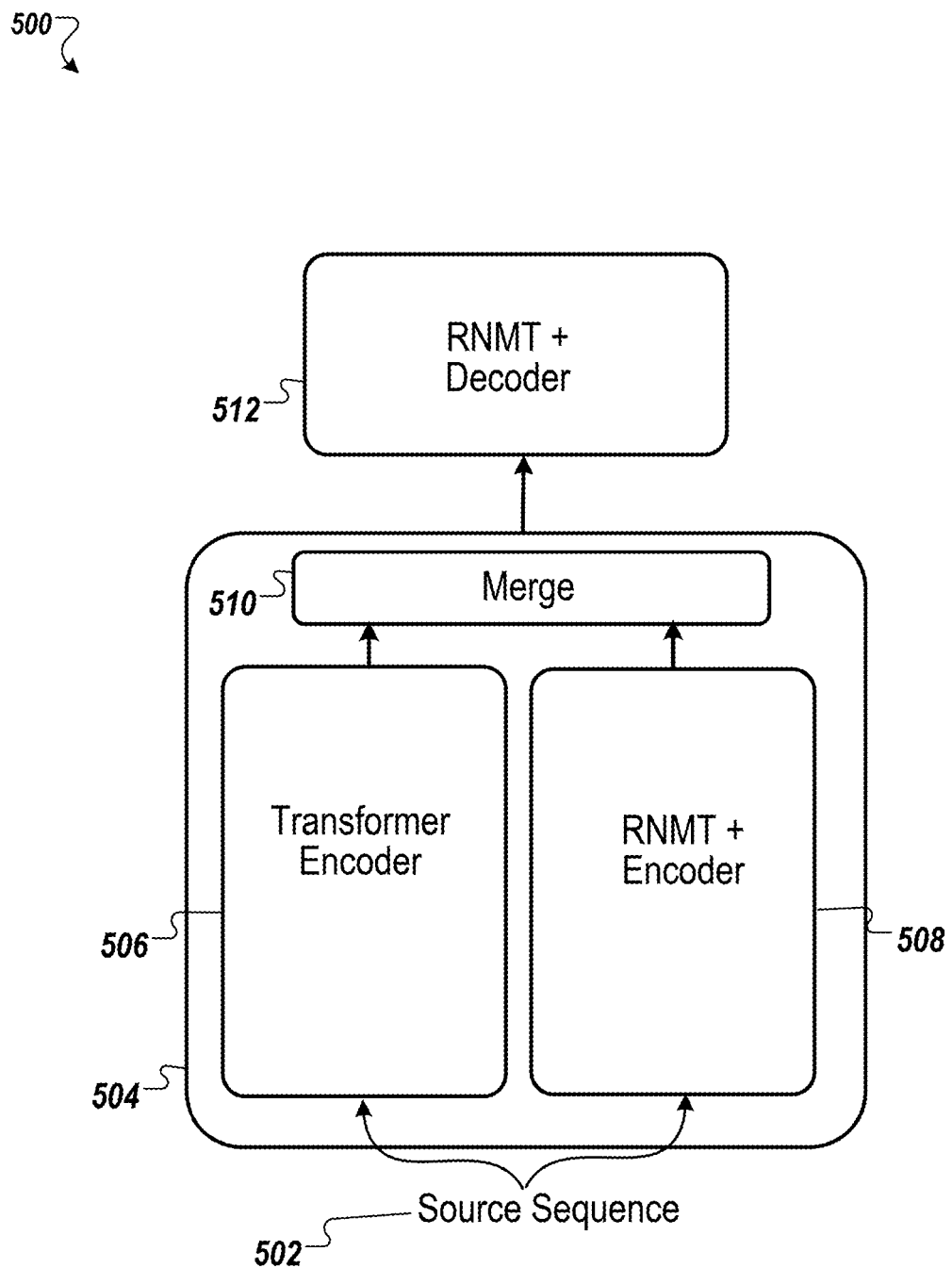
FIG. 5 illustrates of a neural network model having an encoder that includes a transformer encoder module and an RNMT+ encoder module in a parallel or multi-column arrangement.

FIG. 5 illustrates an example of another system 500 of a transformer model and RNMT+ model components in an encoder. The system 500 includes a multi-column encoder 504 and an RNMT+ Decoder 512. The RNMT+ Decoder 512 may be similar to the decoder 207 and decoder 412. The multi-column encoder 504 includes a Transformer Encoder 506, an RNMT+ Encoder 508, and a merge layer 510. The multi-column encoder 404 and the RNMT+ Decoder 412 can include a multi-headed attention module between the merge layer 510 and the RNMT+ Decoder 512. The focus of the system 500 is to merge the output of several independent encoders into a single combined representation (e.g., using the merge layer 510). The benefit of having a system 500 allows a further distinction as to whether the RNMT+ decoder 512 can distinguish information from the transformer encoder 506 and the RNMT+ encoder 508.

Figure 6:
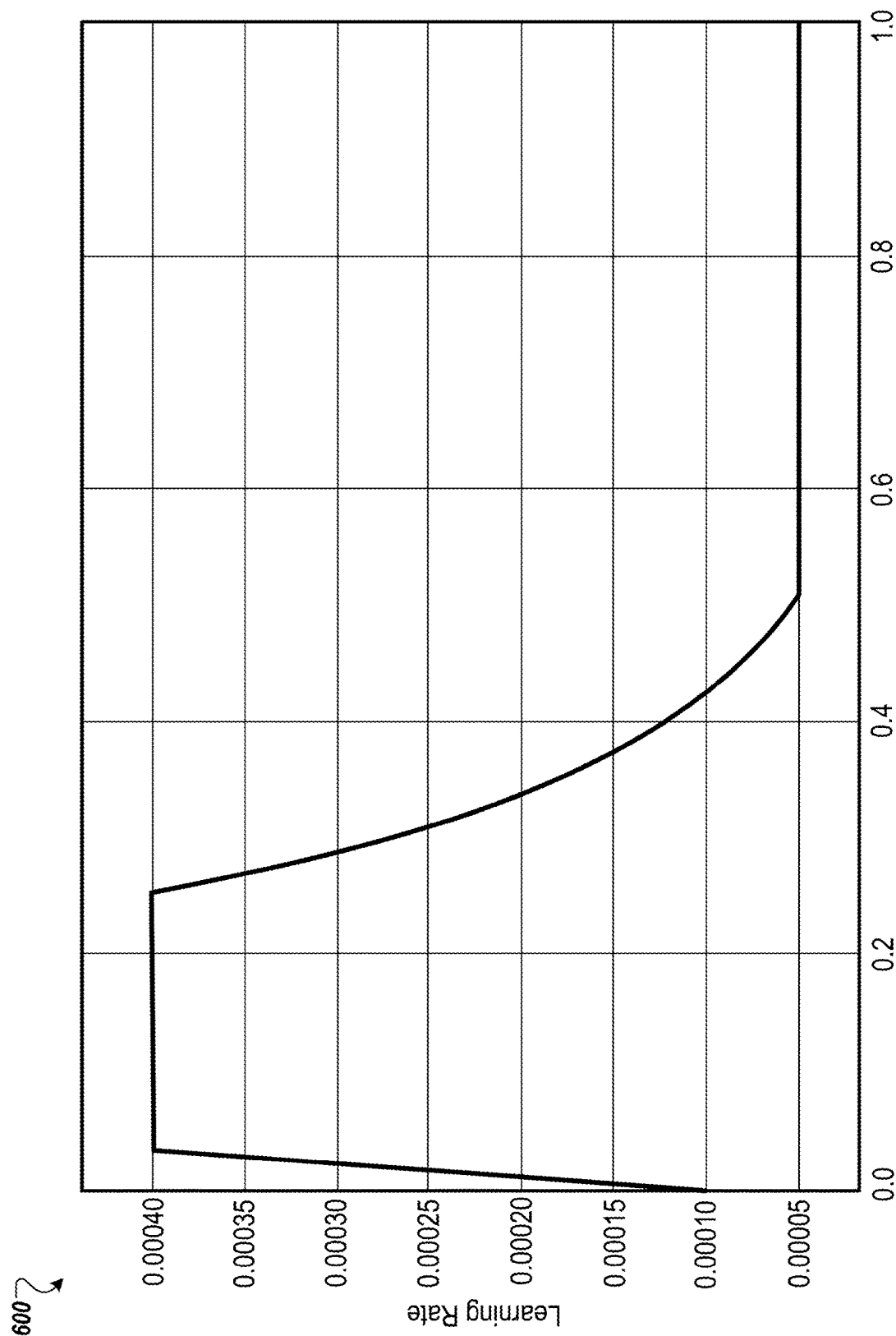
FIG. 6 illustrates a graph of a learning-rate schedule for a neural network machine translation model.

FIG. 6 illustrates a graph 600 of a RNMT+ learning-rate schedule. As illustrated in the graphical FIG. 600, the RNMT+ encoder and decoder is trained with 1024 LSTM nodes. The input embedding dimension is 1024. The multi-head attention module 216 has four neural networks. As can be seen in the graphical FIG. 600, the learning rate rapidly increases then levels off within the first 0.2 training steps. After 0.4 training steps, the learning rate steadies off until flattening.

In many instances, new architectures are accompanied by a novel set of techniques for performing training and inference that have been carefully optimized to work in concert. This 'bag of tricks' can be crucial to the performance of a proposed architecture, yet it is typically under-documented and left for the enterprising researcher to discover in publicly released code (if any) or through anecdotal evidence. This is not simply a problem for reproducibility; it obscures the central scientific question of how much of the observed gains come from the new architecture and how much can be attributed to the associated training and inference techniques. In some cases, these new techniques may be broadly applicable to other architectures and thus constitute a major, though implicit, contribution of an architecture paper. Clearly, they need to be considered in order to ensure a fair comparison across different model architectures.

The techniques and methods described below contribute significantly to the success of recent architectures, namely ConvS2S and Transformer, and explore applying these methods to other architectures, including RNMT models. In doing so, the enhanced version of RNMT, referred to as RNMT+ significantly outperforms all individual architectures in the setup described below. The new architectures introduced illustrate different components borrowed from RNMT+, ConvS2S and Transformer. In order to ensure a fair setting for comparison, all architectures were implemented in the same framework, use the same pre-processed data and apply no further post-processing as this may confound bare model performance.

The contributions illustrated below are three-fold: (1) In ablation studies, the effect of several modeling improvements (including multi-head attention and layer normalization) are quantified as well as optimization techniques (such as synchronous replica training and label-smoothing), which are used in recent architectures. These techniques are applicable across different model architectures. (2) Combining these improvements with the RNMT model into a new RNMT+ model, which significantly outperforms all fundamental architectures on the widely-used WMT' 14 English to French and English to German benchmark datasets. A detailed model analysis is provided along with a comparison of RNMT+, ConvS2S and Transformer in terms of model quality, model size, and training and inference speed. (3) Inspired by the relative strengths and weaknesses of individual model architectures, new model architectures are composed that combine components from the RNMT+ and the Transformer model, and achieve better results than both individual architectures.

Two prior works provided empirical solutions to the difficulty of training NMT architectures (specifically RNMT). In one instance, elements of NMT architectures were explored as to which elements of NMT architectures have a significant impact on translation quality. In another instance, three specific techniques were recommended for strengthening NMT systems and empirically demonstrated how incorporating those techniques improve the reliability of the experimental results.

In this section, the commonly used NMT architectures are discussed. RNMT models are composed of an encoder RNN and a decoder RNN, coupled with an attention network. The encoder summarizes the input sequence into a set of vectors while the decoder conditions on the encoded input sequence through an attention mechanism, and generates the output sequence one token at a time.

The most successful RNMT models consist of stacked RNN encoders with one or more bidirectional RNNs, and stacked decoders with unidirectional RNNs. Both encoder and decoder RNNs consist of either LSTM or GRU units, and make extensive use of residual or highway connections.

In Google-NMT (GNMT), the best performing RNMT model on the datasets considered, the encoder network consists of one bi-directional LSTM layer, followed by 7 unidirectional LSTM layers. The decoder is equipped with a single attention network and 8 unidirectional LSTM layers. Both the encoder and the decoder use residual skip connections between consecutive layers.

The GNMT is adopted as the starting point for the proposed RNMT+ architecture, following the public NMT codebase.

In the most successful convolutional sequence-to-sequence model, both the encoder and decoder are constructed by stacking multiple convolutional layers, where each layer contains 1-dimensional convolutions followed by a gated linear units (GLU). Each decoder layer computes a separate dot-product attention by using the current decoder layer output and the final encoder layer outputs. Positional embeddings are used to provide explicit positional information to the model. The gradients of the encoder layers are scaled to stabilize training. The residual connections across each convolutional layer are used and weight normalization is applied to speed up convergence. The public ConvS2S codebase is followed in the below experiments.

The Transformer model is motivated by two major design choices that aim to address deficiencies in the former two model families: (1) Unlike RNMT, but similar to the ConvS2S, the Transformer model avoids any sequential dependencies in both the encoder and decoder networks to maximally parallelize training. (2) To address the limited context problem (limited receptive field) present in ConvS2S, the Transformer model makes pervasive use of self-attention networks so that each position in the current layer has access to information from all other positions in the previous layer.

The Transformer model still follows the encoder-decoder paradigm. Encoder transformer layers are built with two sub-modules: (1) a self-attention network and (2) a feed-forward network. Decoder transformer layers have an additional cross-attention layer sandwiched between the self-attention and feed-forward layers to attend to the encoder outputs.

There are two very important details to the model's performance: (1) Each sub-layer in the transformer (i.e. self-attention, cross-attention, and the feed-forward sub-layer) follows a strict computation sequence: normalize→transform→dropout→residual-add. (2) In addition to per-layer normalization, the final encoder output is again normalized to prevent a blow up after consecutive residual additions.

The latest version of the Transformer model in the public Tensor2Tensor codebase is followed.

From a theoretical point of view, RNNs belong to the most expressive members of the neural network family. Possessing an infinite Markovian structure (and thus infinite receptive fields) equips RNNs to model sequential data, especially natural language effectively. In practice, RNNs are notoriously hard to train, confirming the well-known dilemma of trainability versus expressivity. Convolutional layers are adept at capturing local context and local correlations by design. A fixed and narrow receptive field for each convolutional layer limits their capacity when the architecture is shallow. In practice, this weakness is mitigated by stacking more convolutional layers (e.g. 15 layers as in the ConvS2S model), which makes the model harder to train and demands meticulous initialization schemes and carefully designed regularization techniques.

The transformer network is capable of approximating arbitrary squashing functions, and can be considered a strong feature extractor with extended receptive fields capable of linking salient features from the entire sequence. On the other hand, lacking a memory component (as present in the RNN models) prevents the network from modeling a state space, reducing the RNN's theoretical strength as a sequence model, thus the RNN requires additional positional information (e.g. sinusoidal positional encodings).

Above theoretical characterizations will drive explorations in the following sections.

The models are trained on the standard WMT'14 English to French and English to German datasets that comprise 36.3M and 4.5M sentence pairs, respectively. Each sentence was encoded into a sequence of sub-word units obtained by first tokenizing the sentence with the Moses tokenizer, then splitting tokens into sub-word units (also known as "word pieces").

A shared vocabulary of 32K sub-word units is used for each source-target language pair. No further manual or rule-based post processing of the output was performed beyond combining the sub-word units to generate the targets. Newstest 2014 includes the results, which serves as the test set. A combination of newstest 2012 and newstest 2013 is used for validation.

To evaluate the models, the BLEU metric is computed on tokenized, true-case output. For each training run, the model is evaluated every 30 minutes on the development set. Once the model converges, the best window is determined based on the average development-set BLEU score over 21 consecutive evaluations. The mean test score and standard deviation are reported over the selected window. The model architectures can be compared based on their mean performance after convergence rather than individual checkpoint evaluations, as the latter can be quite noisy for some models.

To enable a fair comparison of architectures, the same pre-processing and evaluation methodology is used for each experiment. The checkpoint averaging (exponential moving averages of parameters) or checkpoint ensembles is refrained from being used to focus on evaluating the performance of individual models.

The newly proposed RNMT+ model architecture is shown in FIG. 1. Here, the key architectural choices that are different between the RNMT+ model and the GNMT model are highlighted. There are 6 bidirectional LSTM layers in the encoder instead of 1 bidirectional LSTM layer followed by 7 unidirectional layers as in GNMT. For each bidirectional layer, the outputs of the forward layer and the backward layer are concatenated before being fed into the next layer. The decoder network consists of 8 unidirectional LSTM layers similar to the GNMT model. Residual connections are added to the third layer and above for both the encoder and decoder. Inspired by the Transformer model, per-gate layer normalization is applied within each LSTM cell. The empirical results show that layer normalization greatly stabilizes training. No non-linearity is applied to the LSTM output. A projection layer is added to the encoder final output. Additional projection aims to reduce the dimensionality of the encoder output representations to match the decoder stack dimension. Multi-head additive attention is used instead of the single-head attention in the GNMT model. Similar to GNMT, the bottom decoder layer and the final encoder layer output is used after projection for obtaining the recurrent attention context. In addition to feeding the attention context to all decoder LSTM layers, it is fed to the softmax. This is important for both the quality of the models with multi-head attention and the stability of the training process.

Since the encoder network in RNMT+ consists solely of bi-directional LSTM layers, model parallelism is not used during training. The resulting longer per-step time is compensated for with increased data parallelism (more model replicas), so that the overall time to reach convergence of the RNMT+ model is still comparable to that of GNMT.

The following regularization techniques are applied during training: dropout, label smoothing, and weight decay.

Dropout is applied to both embedding layers and each LSTM layer output before it is added to the next layer's input. Attention dropout is also applied.

Uniform label smoothing is used with an uncertainty=0.1. Label smoothing was shown to have a positive impact on both Transformer and RNMT+ models, especially in the case of RNMT+ with multi-head attention. It is beneficial to use a larger beam size (e.g. 16, 20, etc.) during decoding when models are trained with label smoothing.

Here, t is the current step, n is the number of concurrent model replicas used in training, p is the number of warmup steps, s is the start step of the exponential decay, and e is the end step of the decay. First, the learning rate is increased linearly during the number of warmup steps, keep it a constant until the decay start step s, then exponentially decay until the decay end step e, and keep it at $5*10^{-5}$ after the decay ends. This learning rate schedule is motivated by a similar schedule that was successfully applied in training the Resnet-50 model with a very large batch size.

In contrast to the asynchronous training used for GNMT, the RNMT+ models can be trained with synchronous training. The empirical results suggest that when hyper-parameters are tuned properly, synchronous training often leads to improved convergence speed and superior model quality.

To further stabilize training, adaptive gradient clipping is also used. A training step is completely disregarded if an anomaly in the gradient norm value is detected, which is usually an indication of an imminent gradient explosion. More specifically, a moving average is monitored and a moving standard deviation of the log of the gradient norm values, and a step is aborted if the norm of the gradient exceeds four standard deviations of the moving average.

In this section, the results of RNMT+ are compared with the results of the ConvS2S and Transformer.

For RNMT+, a sentence-level cross-entropy loss is used. Each training batch contained 4096 sentence pairs (4096 source sequences and 4096 target sequences). For ConvS2S and Transformer models, token-level cross-entropy loss is used. Each training batch contained 65536 source tokens and 65536 target tokens. For the GNMT baselines on both tasks, the largest BLEU score reported is cited without reinforcement learning.

Table 1 shows results on the WMT'14 English to French task. Both the Transformer Big model and RNMT+ outperform GNMT and ConvS2S by about 2 BLEU points. RNMT+ is slightly better than the Transformer Big model in terms of its mean BLEU score. RNMT+ also yields a much lower standard deviation, and hence, observed much less fluctuation in the training curve. It takes approximately 3 days for the Transformer Base model to converge, while both RNMT+ and the Transformer Big model require about 5 days to converge. Although the batching schemes are quite different between the Transformer Big and the RNMT+ model, they have processed about the same amount of training samples upon convergence. The numbers before and after '±' are the mean and standard deviation of test BLEU score over an evaluation window.

TABLE 1

Results on WMT14 English to French.

| Model | Test BLEU | Epochs | Training Time |
|---|---|---|---|
| GNMT | 38.95 | — | — |
| ConvS2S[7] | 39.49 ± 0.11 | 62.2 | 438 h |
| Trans. Base | 39.43 ± 0.17 | 20.7 | 90 h |
| Trans. Big[8] | 40.73 ± 0.19 | 8.3 | 120 h |
| RNMT+ | 41.00 ± 0.05 | 8.5 | 120 h |

Table 2 shows our results on the WMT'14 English to German task. The Transformer Base model improves over GNMT and ConvS2S by more than 2 BLEU points while the Big model improves by over 3 BLEU points. RNMT+ further outperforms the Transformer Big model and establishes a new state of the art with an averaged value of 28.49. In this case, RNMT+ converged slightly faster than the Transformer Big model and maintained much more stable performance after convergence with a very small standard deviation, which is similar to the observance on the English to French task.

TABLE 2

| Model | Test BLEU | Epochs | Training Time |
|---|---|---|---|
| GNMT | 24.67 | — | — |
| ConvS2S | 25.01 ± 0.17 | 38 | 20 h |
| Trans. Base | 27.26 ± 0.15 | 38 | 17 h |
| Trans. Big | 27.94 ± 0.18 | 26.9 | 48 h |
| RNMT+ | 28.49 ± 0.05 | 24.6 | 40 h |

Table 3 summarizes training performance and model statistics. The Transformer Base model is the fastest model in terms of training speed. RNMT+ is slower to train than the Transformer Big model on a per-GPU basis. However, since the RNMT+ model is quite stable, the lower per-GPU throughput is offset with higher concurrency by increasing the number of model replicas, and hence the overall time to convergence was not slowed down much. The number of floating point operations (FLOPs) was also computed in the model's forward path as well as the number of total parameters for all architectures (see Table 3). RNMT+ requires fewer FLOPs than the Transformer Big model, even though both models have a comparable number of parameters. Examples are normalized by the number of GPUs used in the training job. FLOPs are computed assuming that source and target sequence length are both 50.

TABLE 3

Performance comparison.

| Model | Examples/s | FLOPs | Parameters |
|---|---|---|---|
| ConvS2S | 80 | 15.7B | 263.4M |
| Trans. Base | 160 | 6.2B | 93.3M |
| Trans. Big | 50 | 31.2B | 375.4M |
| RNMT+ | 30 | 28.1B | 378.9M |

In this section, the importance of four main techniques for both the RNMT+ and the Transformer Big models are evaluated. These techniques are universally applicable across different model architectures, and should always be employed by NMT practitioners for best performance.

The best RNMT+ and TransformerBig models are used and removing each one of these techniques occurs independently. By doing this, two things about each technique can be learned: (1) How much does it affect the model performance? (2) How useful is it for stable training of other techniques and hence the final model?

Table 4 shows ablation results of RNMT+ and the Transformer Big model on WMT'14 English to French. Average BLEU scores on the test set are reported. An asterisk '*' indicates an unstable training run (training halts due to non-finite elements).

TABLE 4

| Model | RNMT+ | Trans. Big |
|---|---|---|
| Baseline | 41.00 | 40.73 |
| Label Smoothing | 40.33 | 40.49 |
| Multi-head Attention | 40.44 | 39.83 |
| Layer Norm. | * | * |
| Sync. Training | 39.68 | * |

From Table 4, the various conclusions about the four techniques can be drawn. Label smoothing improves both models, leading to an average increase of 0.7 BLEU for RNMT+ and 0.2 BLEU for Transformer Big models. Multi-head attention contributes significantly to the quality of both models, resulting in an average increase of 0.6 BLEU for RNMT+ and 0.9 BLEU for Transformer Big models. Of the factors shown in Table 4, layer normalization is most significant to stabilize the training process of either model, especially when multi-head attention is used. Removing layer normalization results in unstable training runs for both models. Since by design, one technique can be removed at a time in our ablation experiments, along with an inability to quantify how much layer normalization helped in either case. To be able to successfully train a model without layer normalization, other parts of the model would have to be adjusted and hyper-parameters would have to be returned.

Removing synchronous training has different effects on RNMT+ and Transformer. For RNMT+, it results in a significant quality drop, while for the Transformer Big model, it causes the model to become unstable. Also, synchronous training is only successful when coupled with a tailored learning rate schedule that has a warmup stage at the beginning (see Eq. 1 for RNMT+ and Eq. 2 for Transformer). For RNMT+, removing this warmup stage during synchronous training causes the model to become unstable.

In this section, hybrid architectures are explored that shed some light on the salient behavior of each model family. These hybrid models outperform the individual architectures on both benchmark datasets and provide a better understanding of the capabilities and limitations of each model family.

In an encoder-decoder architecture, a natural assumption is that the role of an encoder is to build feature representations that can best encode the meaning of the source sequence, while a decoder should be able to process and interpret the representations from the encoder and, at the same time, track the current target history. Decoding is inherently auto-regressive, and keeping track of the state information should therefore be intuitively beneficial for conditional generation.

Which family of encoders is more suitable to extract rich representations from a given input sequence is studied, and which family of decoders can make the best of such rich representations. First, combining the encoder and decoder from different model families. Since it takes a significant amount of time for a ConvS2S model to converge, and because the final translation quality was not on par with the other models, two types of hybrids are focused on, a Transformer encoder with RNMT+ decoder and RNMT+ encoder with Transformer decoder.

TABLE 5

Results for encoder-decoder hybrids.

| Encoder | Decoder | En→Fr Test BLEU |
|---|---|---|
| Trans. Big | Trans. Big | 40.73 ± 0.19 |
| RNMT+ | RNMT+ | 41.00 ± 0.05 |
| Trans. Big | RNMT+ | 41.12 ± 0.16 |
| RNMT+ | Trans. Big | 39.92 ± 0.21 |

From Table 5, it is clear that the Transformer encoder is better at encoding or feature extraction than the RNMT+ encoder, whereas RNMT+ is better at decoding or conditional language modeling, confirming an intuition that a stateful decoder is beneficial for conditional language generation.

The features extracted by an encoder can be further enhanced by incorporating additional information. For example, the combination of transformer layers with RNMT+ layers in the same encoder block builds even richer feature representations. RNMT+ decoders are used in the following architectures, since stateful decoders have often shown better performance (see Table 5).

Two mixing schemes for combining RNMT+ and Transformer encoder layers are discussed below, the cascaded encoder arrangement and the multi-column encoder arrangement.

As illustrated in FIG. 4, the cascaded encoder aims at combining the representational power of RNNs and self-attention. The idea is to enrich a set of stateful representations by cascading a feature extractor with a focus on vertical mapping. Our best performing cascaded encoder involves fine tuning transformer layers stacked on top of a pre-trained frozen RNMT+ encoder. Using a pre-trained encoder avoids optimization difficulties while significantly enhancing encoder capacity. As shown in Table 6 below, the cascaded encoder improves over the Transformer encoder by more than 0.5 BLEU points on the WMT'14 English to French task. This suggests that the Transformer encoder is able to extract richer representations if the input is augmented with sequential context.

As illustrated in FIG. 5, a multi-column encoder merges the outputs of several independent encoders into a single combined representation. Unlike a cascaded encoder, the multi-column encoder allows for further investigation as to whether an RNMT+ decoder can distinguish information received from two different channels and benefit from its combination. A crucial operation in a multi-column encoder is therefore how different sources of information are merged into a unified representation. In some situations, the best multi-column encoder performs a simple concatenation of individual column outputs.

The model details and hyper-parameters of the above two encoders are described below. As shown in Table 6, the multi-column encoder followed by an RNMT+ decoder achieves better results than the Transformer and the RNMT model on both WMT'14 benchmark tasks.

In this work, the efficacy of several architectural and training techniques proposed in recent studies on seq2seq models for NMT has been explored here. Many of these techniques are broadly applicable to multiple model architectures. Applying these new techniques to RNMT models yields RNMT+, an enhanced RNMT model that significantly outperforms the three fundamental architectures on WMT'14 English to French and English to German tasks. Several hybrid models are further developed by combining encoders and decoders from the Transformer and RNMT+ models, and empirically demonstrated the superiority of the Transformer encoder and the RNMT+ decoder in comparison with their counterparts. The encoder's architecture is enhanced by horizontally and vertically mixing components borrowed from these architectures, leading to hybrid architectures that obtain further improvements over RNMT+.

TABLE 6

Results for hybrids with cascaded encoder and multi-column encoder.

| Model | En→Fr BLEU | En→De BLEU |
|---|---|---|
| Trans. Big | 40.73 ± 0.19 | 27.94 ± 0.18 |
| RNMT+ | 41.00 ± 0.05 | 28.59 ± 0.05 |
| Cascaded | 41.67 ± 0.11 | 28.62 ± 0.06 |
| MultiCol | 41.66 ± 0.11 | 28.84 ± 0.06 |

For the WMT'14 English to German task, both the encoder and decoder have 15 layers, with 512 hidden units in the first ten layers, 768 units in the subsequent three layers and 2048 units in the final two layers. The first 13 layers use kernel width 3 and the final two layers use kernel width 1. For the WMT'14 English to French task, both the encoder and decoder have 14 layers, with 512 hidden units in the first five layers, 768 units in the subsequent four layers, 1024 units in the next three layers, and 2048 units and 4096 units in the final two layers. The first 12 layers use kernel width 3 and the final two layers use kernel width 1. The ConvS2S models are trained with synchronous training using 32 GPUs.

Both the encoder and the decoder have 6 Transformer layers. Transformer base model has model dimension 512, hidden dimension 2048, and 8 attention heads. The Transformer Big model uses model dimension 1024, hidden dimension 8192, and 16 attention heads. The dropout in Transformer models are grouped into four types: input dropout—dropout applied to the sum of token embeddings and position encodings; residual dropout—dropout applied to the output of each sublayer before added to the sublayer input; relu dropout—dropout applied to the inner layer output after ReLU activation in each feed-forward sub-layer; and, attention dropout—dropout applied to attention weight in each attention sub-layer. All Transformer models use the following learning rate schedule:

$$lr = \frac{r_0}{\sqrt{d_{model}}} * \min\left(\frac{t+1}{p\sqrt{p}}, \frac{1}{\sqrt{(t+1)}}\right). \quad (2)$$

where t is the current step, p is the number of warmup steps, $d_{model}$ is the model dimension, and $r_0$ is a constant to adjust the magnitude of the learning rate.

On WMT'14 English to German, the Transformer Base model employs all four types of dropout with dropout-_probs=0.1. $r_0$=2.0 and p=8000 is used in the learning rate schedule. For the Transformer Big model, only residual dropout and input dropout are applied, both with dropout-_probs=0.3. $r_0$=3.0 and p=40000 are used in the learning rate schedule.

Both Transformer base model and big model are trained with synchronous training using 16 GPUs.

RNMT+ has 1024 LSTM nodes in all encoder and decoder layers. The input embedding dimension is 1024 as well. The encoder final projection layer projects the last bidirectional layer output from dimension 2048 to 1024. 4 attention heads are used in the multi-head additive attention. Label smoothing is applied with an uncertainty=0.1. FIG. 3 illustrates our learning rate schedule defined in Eq. 1.

For both encoder-decoder hybrids, i.e., Transformer Big encoder with RNMT+ decoder and RNMT+ encoder with Transformer Big decoder, the exact same model hyper-parameters are used as in the Transformer Big and RNMT+ models described previously.

In this hybrid, a transformer encoder is stacked on top of the RNMT+ encoder. During experimentation, a pre-trained RNMT+ encoder is used, including the projection layer, as previously described. The outputs of the RNMT+ encoder are layer normalized and fed into a transformer encoder. This structure is illustrated in FIG. 2a. The transformer encoder is identical to the one described previously per the conditional transformation-based NMT models except for the different number of layers. Another setup includes 4 Transformer layers stacked on top of a pre-trained RNMT+ encoder with 6 layers. To speed up convergence, the gradient updates were frozen in the pre-trained RNMT+ encoder. This enables increasing the encoder capacity significantly, while avoiding optimization issues encountered in non-frozen variants of the hybrid. As an additional benefit, this enables training the model on P100s without the need for model parallelism.

Note that this specific layout allows for dropping hand-crafted sinusoidal positional embeddings (since positional information is already captured by the underlying RNNs).

A simple concatenation as the merger-operator without fine-tuning any other model hyper-parameters. After concatenation, the combined representation is projected down to the decoder dimension with a layer-normalized affine transformation. Although only two columns are illustrated here, there is no practical restriction on the total number of columns that this hybrid can combine. By combining multiple encoder representations, the network may capture different factors of variations in the input sequence.

Similar to the Cascaded-RNMT+ hybrid, pre-trained encoders are used that are borrowed from an RNMT+ model (a pre-trained RNMT+ encoder is used as the first column) and an Encoder-Decoder hybrid model with Transformer encoder and RNMT+ decoder (the pre-trained Transformer encoder is used). Multi-column encoder with RNMT+ decoder is trained using 16 GPUs in a synchronous training setup. The simple concatenation operation is used as the merger-operator, and after concatenation, the combined representation is projected down the decoder dimension with a simple layer-normalized affine transformation. Additionally, for the sake of stability and trainability, each column output should be first mapped to a space where the representation ranges are compatible, e.g., RNMT+ encoder output has no limitation on its range, but a Transformer Encoder output range is constrained by the final layernormalization applied to the entire Transformer encoder body. Therefore, a layer normalization is applied to the RNMT+ encoder outputs to match the ranges of individual encoders.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 7:
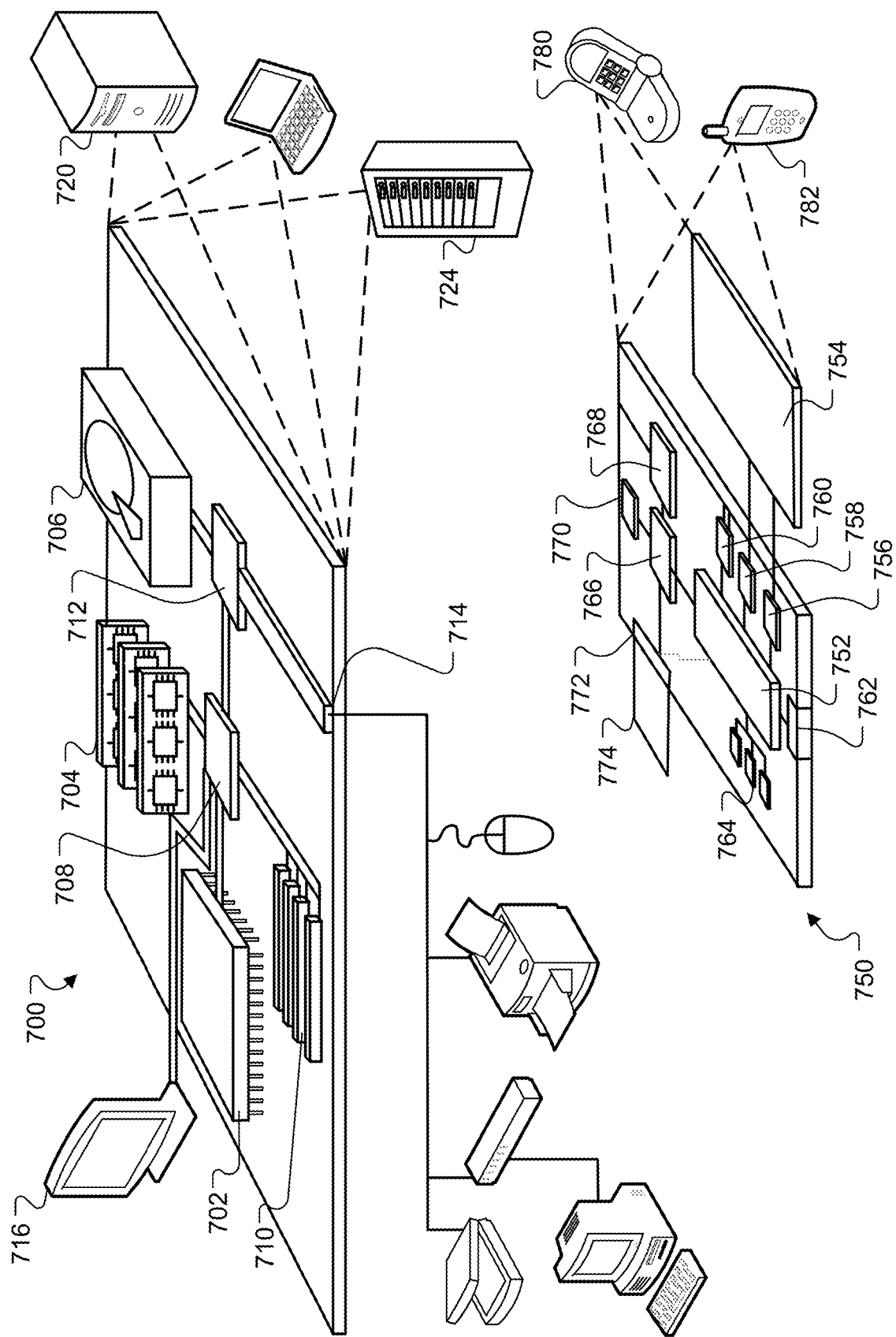
FIG. 7 shows an example of a computing device and a mobile computing device.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for performing machine translation of text from a first language to a second language, the method comprising:
    generating, by one or more processors, a set of encoding vectors from a series of feature vectors representing characteristics of a text segment in the first language, by processing the feature vectors with an encoder neural network comprising a set of bidirectional recurrent neural network layers, each encoding vector of the set having a predetermined number of values;
    generating, by the one or more processors, multiple context vectors for each encoding vector based on multiple sets of parameters, the multiple sets of parameters being respectively used to generate the context vectors from different subsets of each encoding vector;
    generating, by the one or more processors, a sequence of output vectors using a decoder neural network that receives the context vectors, the decoder neural network comprising a recurrent neural network, the output vectors representing distributions over language elements of the second language; and
    determining, by the one or more processors, a translation of the text segment into the second language based on the sequence of output vectors.

2. The method of claim 1, further comprising:
    providing the translation to a client device in response to a translation request.

3. The method of claim 1, wherein the recurrent neural network in the decoder neural network does not perform self-attention.

4. The method of claim 1, wherein the set of bidirectional recurrent neural network layers of the encoder neural network comprise long short-term memory (LSTM) layers.

5. The method of claim 1, wherein the parameters are weighting values, and the different sets of the parameters are applicable to different non-overlapping continuous chunks of the encoding vectors.

6. The method of claim 1, wherein the decoder neural network is configured to receive the context vectors, concatenated together, at a softmax layer providing output of the decoder neural network.

7. The method of claim 1, wherein two or more of the language elements of the second language comprise characters, word pieces, words, or phrases.

8. The method of claim 1, wherein the encoder neural network and the decoder neural network include a normalization layer between each recurrent hidden neural network layer.

9. The method of claim 1, wherein at least one of the encoder neural network and the decoder neural network have been trained using synchronous training.

10. The method of claim 1, wherein at least one of the encoder neural network and the decoder neural network have been trained using a learning rate that increases gradually during training.

11. The method of claim 1, wherein at least one of the encoder neural network and the decoder neural network have been trained using label smoothing that introduces variability into target labels.

12. The method of claim 1, wherein:
the encoder neural network comprises a first encoder module and a second encoder module, the first encoder module and the second encoder module having different neural network topologies;
the first encoder module uses a transformer layer structure with layers that each include (i) a self-attention network sub-layer and (ii) a feed-forward network sub-layer; and
the second encoder module includes a series of bidirectional recurrent neural network layers each providing normalization before processing by a next recurrent layer.

13. A system comprising:
one or more processors; and
one or more data storage devices storing instructions that, when executed by the one or more processors, cause the one or more processors to perform operations comprising:
generating a set of encoding vectors from a series of feature vectors representing characteristics of a text segment in a first language by processing the series of feature vectors with an encoder neural network comprising a set of bidirectional recurrent neural network layers, each encoding vector of the set having a predetermined number of values;
generating multiple context vectors for each encoding vector based on multiple sets of parameters, the multiple sets of parameters being respectively used to generate the context vectors from different subsets of each encoding vector;
generating a sequence of output vectors using a decoder neural network that receives the context vectors, the decoder neural network comprising a recurrent neural network, the output vectors representing distributions over language elements of a second language; and
determining a translation of the text segment into the second language based on the sequence of output vectors.

14. A computer-implemented method for performing machine translation of text from a first language to a second language, the method comprising:
obtaining, by a machine translation module, a source embedding associated with a text segment in the first language, the source embedding having a selected dimensionality;
processing, with an encoder neural network of the machine translation module, the source embedding to obtain a set of encoding vectors, the encoder neural network comprising a set of bidirectional recurrent neural network layers including a plurality of forward-propagating layers and a plurality of backward-propagating layers;
normalizing, by the machine translation module, the set of encoding vectors;
processing, by a transformer encoder of the machine translation module, the normalized set of encoding vectors to obtain transformed data;
generating output vectors using a decoder neural network from the transformed data, the decoder neural network comprising a recurrent neural network, the output vectors representing distributions over language elements of the second language; and
determining, by the machine translation module, a translation of the text segment into the second language based on the output vectors.

15. The method of claim 14, further comprising providing the translation to a client device in response to a translation request.

16. The method of claim 14, wherein the recurrent neural network of the decoder neural network does not perform self-attention.

17. The method of claim 14, wherein feature extraction performed by the encoder neural network is cascaded to the transformer encoder.

18. The method of claim 14, wherein the set of bidirectional recurrent neural network layers of the encoder neural network comprise long short-term memory (LSTM) layers.

19. The method of claim 14, wherein processing the normalized set of encoding vectors includes performing multi-headed attention.

20. The method of claim 14, wherein:
the transformer encoder comprises a first encoder module and a second encoder module, the first encoder module and the second encoder module having different neural network topologies;
the first encoder module uses a transformer layer structure with layers that each include (i) a self-attention network sub-layer and (ii) a feed-forward network sub-layer; and
the second encoder module includes a series of bidirectional recurrent neural network layers each providing normalization before processing by a next recurrent layer.

* * * * *